G. J. ARNOLD.
WHEEL WITH DETACHABLE RIM.
APPLICATION FILED OCT. 19, 1914.

1,147,477.

Patented July 20, 1915
2 SHEETS—SHEET 1.

Witnesses:

Inventor
G. J. Arnold

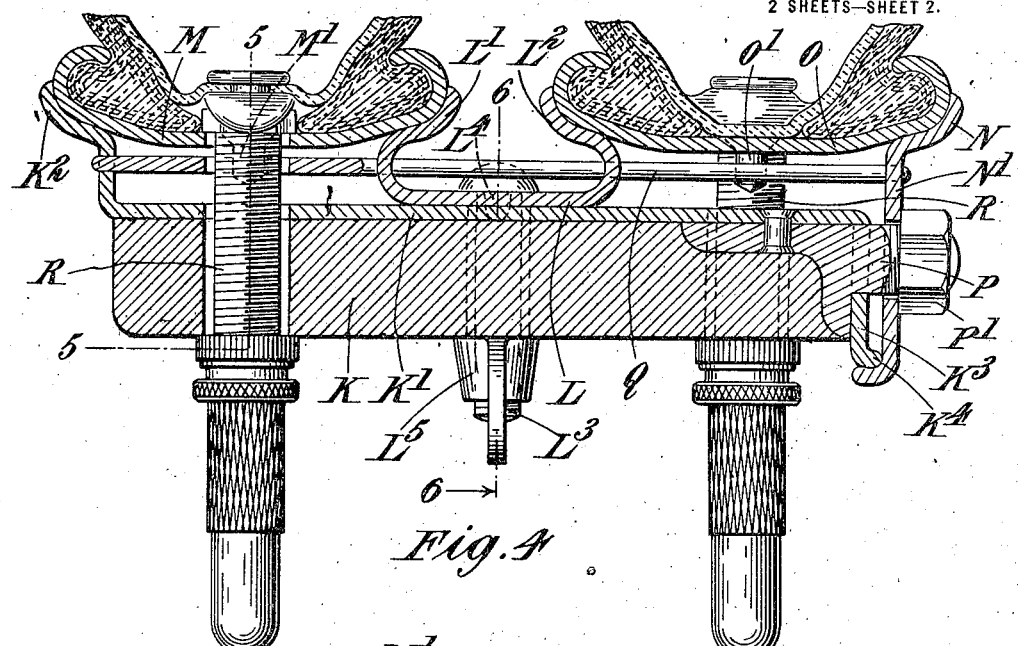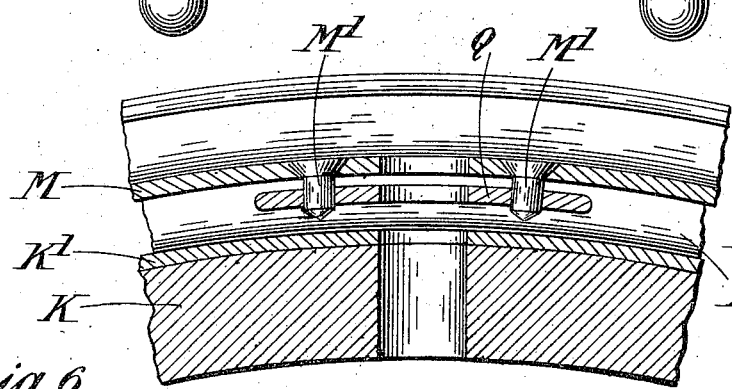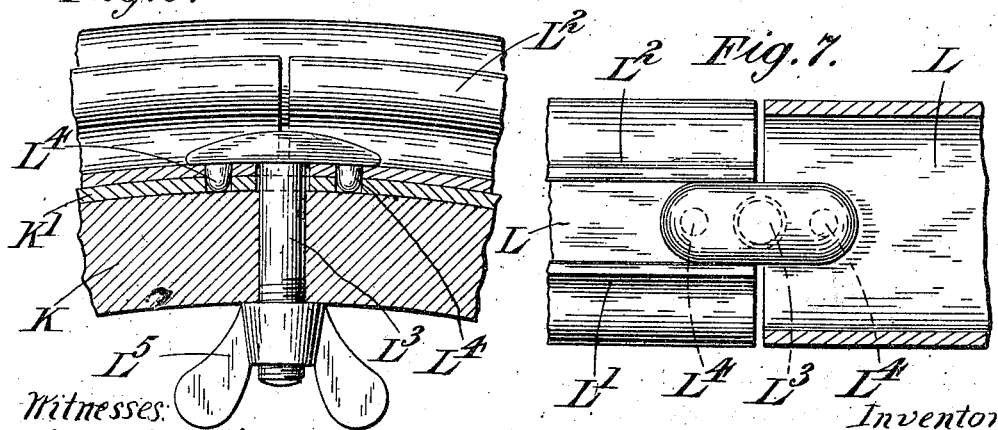

UNITED STATES PATENT OFFICE.

GILBERT JAMES ARNOLD, OF EASTBOURNE, ENGLAND.

WHEEL WITH DETACHABLE RIM.

1,147,477.

Specification of Letters Patent.

Patented July 20, 1915.

Application filed October 19, 1914. Serial No. 867,521.

*To all whom it may concern:*

Be it known that I, GILBERT JAMES ARNOLD, F. R. C. S., a subject of the King of England, residing at Eastbourne, England, have invented certain new and useful Improvements in Wheels with Detachable Rims, of which the following is a specification.

This invention relates to wheels having detachable rims, of the type wherein the rim is gripped between flanges one of which is fast on the wheel and the other is carried by a detachable side-ring. Such rims are usually held by the side-ring being clamped to the wheel-element by bolts and nuts which exert their securing thrust against the side-ring at a point which beds flat against the wheel-element. The side-ring is thus made rigid with the wheel-element and if the rim is a little small it fails to be properly gripped, whereas if it is a little large, it puts great strain upon the bolts and tends to bend them inward or break them.

The object of the present invention is to so secure the side-ring that it constitutes a resilient connection between the detachable rim and the wheel-element, and for this purpose the side-ring is made to bed against the wheel-element only at its inner edge, whereas its outer edge beds against the rim, and the parts are so proportioned that the main body of the side-ring is held free of the wheel-element. The fastening bolts are so positioned as to exert their securing thrust at points between the inner edge of the side-ring which beds against the wheel rim and the outer edge which beds against the detachable rim, and thus the part of the ring which receives the securing thrust can be sprung in under the action of the bolts without its being brought forcibly against the wheel-element; this middle portion of the side-ring thus affords a yielding part which makes the whole ring serve as a resilient connection between the rim and the wheel-element.

Figure 1:
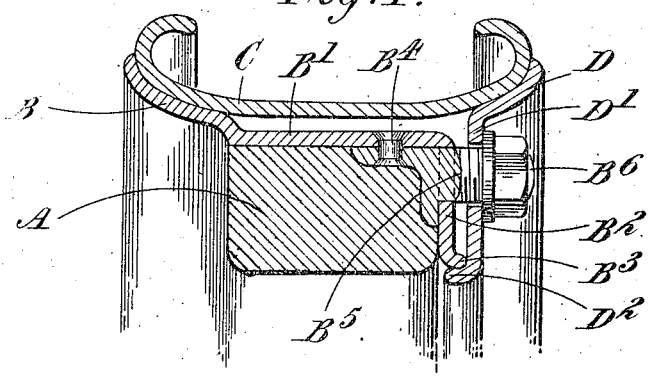
Figure 2:
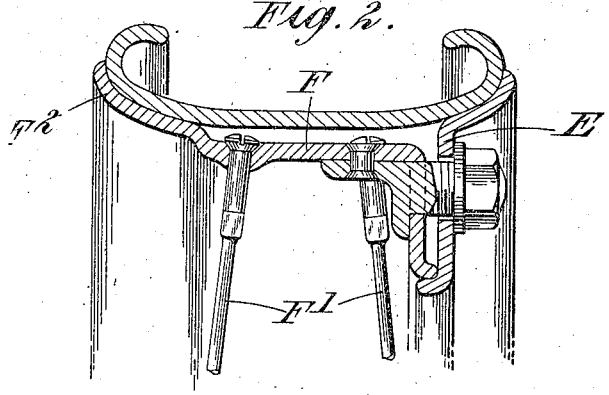
Figure 3:
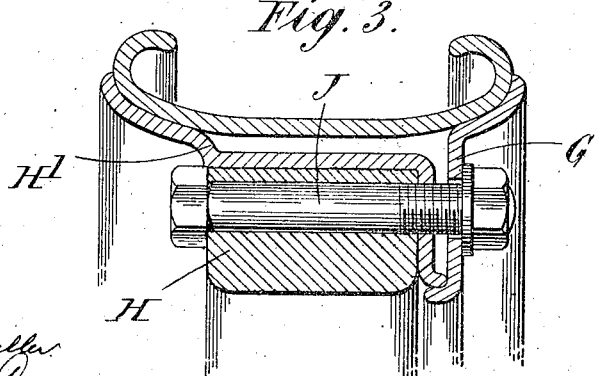

In the accompanying drawings: Figure 1 is a transverse section through a wheel and rim constructed according to one method of carrying out this invention; Fig. 2 is a transverse section through a second form of wheel and rim constructed according to the present invention; Fig. 3 is a transverse section through a third form of wheel and rim constructed according to the present invention; Fig. 4 is a transverse section through a wheel with twin rims constructed according to the present invention; Fig. 5 is a section through part of a wheel and rim on the line 5—5 of Fig. 4; Fig. 6 is a section through part of a wheel and rim on the line 6—6 of Fig. 4, and Fig. 7 is a plan in part section of part of the central flange shown on the wheel in Fig. 4.

The same letters indicate the same parts throughout the drawings.

The wheel-element may take various forms, and in Fig. 1 a wooden felly A is shown having a fixed flange B on one side of it. This flange, which is of metal, is made in one with a band $B^1$ which extends across the face of the felly and is turned over at $B^2$ on that side of the wheel remote from the flange B. The inner edge of this turned over portion $B^2$, that is the edge which is nearest the center of the wheel, is outwardly turned at $B^3$ to provide a lateral rib. The rim C may be of any suitable construction and beds on one side against the flange B and on the other side against a flange D forming part of a detachable side-plate $D^1$. The side-plate has an inwardly directed lip $D^2$ on its inner edge. This lip is made to lie within the annular rib or edge $B^3$ of the plate $B^2$. Secured to the plate $B^1$ by rivets $B^4$ is a series of bolts of which one is shown at $B^5$. These bolts are shaped to form an angle-piece between the band $B^1$ and its over-turned edge $B^2$. The proportions of the rim C and side-ring $D^1$ with its flange D are such that when the inner edge of the side-ring $D^1$ is made to bear against the rib $B^3$ of the wheel-element, the main body of the side-ring is held clear of the side of the wheel-element, that is, of the over-turned portion $B^2$ of the band $B^1$ which with the felly constitutes the wheel-element. The bolts $B^5$ extend through orifices in that portion of the side-ring which lies between the line of contact of the ring with the rib $B^3$ and the line of contact with the rim C. It follows therefore that the securing thrust of the nuts $B^6$ on the bolts is exerted against that part of the side-ring which is not directly supported by the wheel-element, and thus a certain amount of resilience is provided between the wheel-element and the rim C. It will be appreciated that if the ring $D^1$ were allowed to bed itself flat against the wheel-element, this resilience would not exist. Further, it is found that if the inner edge of the side-ring is allowed to bear against the wheel-element and the flanged edge D is held away therefrom by the rim C, strain is put upon the bolts B⁵ which results in their being bent or broken. The rim C does not in itself constitute any part of the present invention and may be of any convenient shape adapted to take any preferred form of tire, but preferably the flanges B and D do not extend right around the sides of the rim, but only about half way around the same as shown in the drawing. The resilience afforded by the arrangement of the side-ring as described, enables a good grip to be obtained of the wheel-rim without breakage of the parts.

In Fig. 2, the same arrangement of side-ring E is shown applied to a wheel-element F having no wooden felly, the spokes F¹ being attached direct to the metal band on which the fixed flange F² is formed.

In Fig. 3 the same arrangement of side-ring G is shown applied to a wheel-element H, H¹ which is similar to that shown in Fig. 1, but provided with bolts J for securing the side-ring which extend right through the wheel-element.

In Fig. 4 the invention is shown as applied to a twin-rimmed wheel. The wooden felly K carries a metal band K¹ having a fixed side flange K² and an overturned edge K³ on the opposite side of the wheel having a lip K⁴, all as has been described with reference to Fig. 1, except that the band K¹ is wide enough to take two rims and their associated parts instead of one. In the middle of the band K¹, a split ring L having double flanges L¹, L² is provided, the flanges being turned in toward each other so that the flange L¹ coöperates with the flange K² to receive a detachable rim M and the flange L² coöperates with a flange N on a side-plate N¹ to receive a detachable rim O. The plate N¹ is secured to the wheel-element by bolts and nuts P, P¹ and made to constitute a resilient connection between the rim O and the wheel-element, as has been already described with reference to the side-ring D, D¹ of Fig. 1.

The central split ring L has its two ends connected by means of a bolt L³ whose stem passes through the band K¹ on the felly K. The head of the bolt lies within the trough formed between the two flanges L¹, L² and has on its under-side two pins L⁴ which engage orifices in the ends of the ring and in the band K¹. The head of the bolt thus holds the ends of the ring L together and can itself be clamped tight by the wing-nut L⁵. The orifices in the band K¹ engaged by the pins L⁴ and the orifice in the felly K through which the stem of the bolt passes, are conveniently slotted in a direction transverse to the circumferential direction of the wheel, so that a little side adjustment of the ring L can be allowed for. It thus follows that when the side ring N¹ is bolted up, the rim O is forced against the ring L, this is thrust home against the rim M, which is in turn clamped against the fixed flange K² so that both rings are held in place by the one detachable side-ring N¹.

To prevent the rims from creeping relatively to the wheel-element, a transverse bar Q is provided which extends through the flange K², the flanges L¹, L², and the central ring L and side ring N¹, slots being provided in all these members to receive it. The rims M and O are provided on their inner side with pins M¹ and O¹ respectively, which engage orifices in the bar Q; the valve-stems R also conveniently extend through this bar and of course extend through the wheel-element also, in the usual manner.

What I claim as my invention and desire to secure by Letters Patent is:—

1. In a wheel and detachable rim, the combination of, a wheel having an outwardly-directed metal flange situated away from one side of the wheel the metal of the flange being however continued across the periphery of the wheel to such side and overlapping the side, the edge of the overlapping portion being shaped to form an outwardly-directed lateral rib, a detachable side-ring whose inner edge beds against the aforesaid rib on the wheel-element and whose outer edge provides a flange opposed to the first-mentioned flange, a detachable rim engaged between the two flanges, and bolts for securing the side-ring to the wheel element so positioned that the securing thrust on the side-ring takes place at points between its lines of contact with the rim and the rib on the wheel-element respectively, the rim being wide enough to hold the main body of the side-ring clear of the wheel-element, for the purpose set forth.

2. In a wheel and detachable rim the combination of, a wheel having an outwardly-directed metal flange situated away from one side of the wheel the metal of the flange being however continued across the periphery of the wheel to such side and overlapping the side, the edge of the overlapping portion being shaped to form an outwardly-directed lateral rib, a detachable side-ring whose inner edge beds against the aforesaid rib on the wheel-element and is provided with a coöperating rib concentric with and lying within the rib on the wheel-element, the outer edge of the side-ring being provided with a flange opposed to the first-mentioned flange, a detachable rim engaged between the two flanges, and bolts for securing the side-ring to the wheel-element so positioned that the securing thrust on the side-ring takes place at points between its lines of contact with the rim and the rib on the wheel-element respectively, the rim being wide enough to hold the main body of the side-ring clear of the wheel-element, for the purpose set forth.

3. In a wheel and detachable rim the combination of, a wheel having fast upon it an outwardly-directed flange at one edge, a central detachable ring having its two edges turned outward away from the wheel and toward each other to provide flanges one facing the fixed flange and the other facing away from the same so that a detachable rim may be gripped between the fixed flange and the middle ring, a side-ring detachably mounted on the wheel-element one of these members having on it a rib so that only the inner edge of the side-ring bears against the wheel-element, the side-ring having a flange to coöperate with the second flange on the middle ring for the purpose of gripping the detachable rim between these two flanges and the parts being so proportioned that the side face of the side-ring is held off the side face of the wheel-element by the aforesaid rib and by engagement of its flange with the rim, and bolts for securing the side-ring to the wheel-element so positioned that the securing thrust on the side-ring takes place at points between the lines of contact with the rim and wheel-element respectively, for the purpose set forth.

In testimony whereof I have signed my name to this specification in the presence of two subscribing witnesses.

GILBERT JAMES ARNOLD.

Witnesses:
HAROLD H. SIMMONS,
A. M. HAYWARD.